United States Patent
Shin

(10) Patent No.: US 11,635,620 B2
(45) Date of Patent: Apr. 25, 2023

(54) HOLOGRAPHIC HUD

(71) Applicant: HYUNDAI MOBIS CO., LTD., Seoul (KR)

(72) Inventor: Min Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 183 days.

(21) Appl. No.: 17/076,686

(22) Filed: Oct. 21, 2020

(65) Prior Publication Data

US 2022/0026713 A1 Jan. 27, 2022

(30) Foreign Application Priority Data

Jul. 23, 2020 (KR) .......................... 10-2020-0091638

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1529* (2019.05); *B60K 2370/23* (2019.05); *B60K 2370/29* (2019.05); *G02B 2027/0112* (2013.01)

(58) Field of Classification Search
CPC ........ G02B 27/0103; G02B 2027/0112; B60K 35/00; B60K 2370/1529; B60K 2370/23; B60K 2370/29
See application file for complete search history.

(56) References Cited

U.S. PATENT DOCUMENTS

| 2015/0219894 A1 | 8/2015 | Yanning et al. |
| 2018/0151194 A1 | 5/2018 | Noguchi |
| 2018/0267316 A1* | 9/2018 | Noguchi ............ G02B 27/0172 |
| 2019/0094546 A1* | 3/2019 | Ide ..................... G02B 27/0172 |

FOREIGN PATENT DOCUMENTS

| JP | 2012078619 | 4/2012 |
| JP | 2015524944 | 8/2015 |
| JP | 2018087949 | 6/2018 |

OTHER PUBLICATIONS

Korean Office Action dated Mar. 8, 2022, issued to Korean Patent Application No. 10-2020-0091638.

* cited by examiner

Primary Examiner — Kimberly N. Kakalec
(74) Attorney, Agent, or Firm — H.C. Park & Associates, PLC

(57) ABSTRACT

A holographic head-up display (HUD) including: a picture generation unit (PGU) including at least one laser light source to generate an optical image to be projected on a HUD; a first mirror to reflect the optical image from the PGU; a second mirror to reflect the optical image reflected by the first mirror; and a holographic optical element (HOE) to diffract the optical image reflected by the second mirror at a first diffraction angle to provide an output optical image in a target direction. The first mirror includes a reflective compensatory HOE to diffract the optical image from the PGU at a second diffraction angle, and in response to change of a wavelength of the optical image from the PGU, the reflective compensatory HOE is configured to diffract the optical image from the PGU at a third diffraction angle different from the second diffraction angle such that the HOE provides the output optical image in the target direction.

14 Claims, 5 Drawing Sheets

(a)

(b)

(a)

(b)

HOLOGRAPHIC HUD

CROSS-REFERENCE TO RELATED APPLICATION

This application claims priority from and the benefit of Korean Patent Application No 10-2020-0091638, filed Jul. 23, 2020, which is hereby incorporated by reference for all purposes as if set forth herein.

BACKGROUND

Field

Exemplary embodiments relate to a holographic head-up display (HUD). More particularly, the present disclosure relates to a holographic HUD, including an additional holographic optical element (HOE) for self-compensation for changes in a light source's wavelength. The statements in this section merely provide background information related to the present disclosure and do not necessarily constitute prior art.

Discussion of the Background

A holographic head-up display (HUD) may include a holographic optical element (HOE).

A HOE film incorporated in a windshield as an element for the vehicle HUD includes a preformed interference pattern configured to selectively react to an incident light having a specific wavelength and a specific incident angle so that the desired diffraction is obtained. The interference pattern is capable of diffracting light with high efficiency under specific conditions as it is formed to satisfy the Bragg matching condition of the HOE film for the incident light.

HOE is an optical element utilizing a diffraction characteristic of light and may provide a large area screen to a driver while reducing the volume occupied by the HUD system. Since the HOE is an element sensitive to the wavelength of the incident light, a laser light source is mainly used for the holographic HUD. Additionally, the emission angle of the diffracted light is subjected to change if the wavelength of the light varies even with the light path toward the HOE remains unchanged. When using a single light source, the image observed at the driver's position is moved from the originally intended position, as shown in FIG. 1, if the wavelength changes. As shown in FIG. 2, the configuration of a typical holographic HUD 10 includes a picture generation unit (PGU) 100 in which an image to be projected on the HUD is generated, a first mirror 200, a second mirror 300, and a HOE 400. As shown in FIG. 2, in the particular application of a color holographic HUD, the respective wavelength of red, green, and blue (R/G/B) lasers may change with a different amount even at the same variation of temperature, so the image observed from the driver's position suffers from color separations as respective color image drifts away from the intended position by a different amount.

When the wavelength of the laser changes due to a temperature change, diffracted light reflected from the HOE 400, which is very sensitive to the wavelength is emitted at a varied angle from the original path. This shifts the image observed from the driver's position from the originally intended position thereof. FIG. 2 illustrates a case in which the light toward the driver is rotated to the right of the light traveling direction as the wavelength of the laser is changed.

The above information disclosed in this Background section is only for enhancement of understanding of the background of the invention and, therefore, it may contain information that does not constitute prior art.

SUMMARY

According to one aspect of the invention, a holographic head-up display (HUD) includes: a picture generation unit (PGU) including at least one laser light source to generate an optical image to be projected on a HUD; a first mirror to reflect the optical image from the PGU; a second mirror to reflect the optical image reflected by the first mirror; and a holographic optical element (HOE) to diffract the optical image reflected by the second mirror at a first diffraction angle to provide an output optical image in a target direction. The first mirror includes a reflective compensatory HOE to diffract the optical image from the PGU at a second diffraction angle, and in response to change of a wavelength of the optical image from the PGU, the reflective compensatory HOE is configured to diffract the optical image from the PGU at a third diffraction angle different from the second diffraction angle such that the HOE provides the output optical image in the target direction.

The second mirror may include any one or a combination of a free-form surface, an spherical surface, a flat surface, and a concave surface.

The optical image from the PGU may be incident on the reflective compensatory HOE along a first optical image path and the optical image reflected by the second mirror may be incident on the HOE along a second optical path. The first optical image path and the second optical path may be configured to have temperatures within a common temperature range.

The temperature range may be equal to or less than 10° C.

The HOE may be configured to be built into a color holographic HUD. The reflective compensatory HOE and the HOE may be substantially formed into the same structure.

The HOE may include a first curved surface, and the reflective compensatory HOE may include a second curved surface having a curvature determined based on an optical system structure of the holographic HUD.

In response to the change of the wavelength, the HOE may be configured to diffract the optical image reflected by the second mirror at a fourth diffraction angle different from the first diffraction angle to provide the output optical image in the target direction.

According to another aspect of the invention, a holographic head-up display (HUD) includes: a picture generation unit (PGU) including at least one laser light source to generate an optical image to be projected on a HUD; a first mirror to reflect the optical image from the PGU; a second mirror to reflect the optical image reflected by the first mirror; a holographic optical element (HOE) to diffract the optical image reflected by the second mirror at a first diffraction angle to provide an output optical image in a target direction; and a transmissible compensatory HOE disposed between the PGU and the first mirror to diffract the optical image from the PGU at a second diffraction angle. In response to change of a wavelength of the optical image from the PGU, the transmissible compensatory HOE is configured to diffract the optical image from the PGU at a third diffraction angle different from the second diffraction angle such that the HOE provides the output optical image in the target direction.

The second mirror may include any one or a combination of a free-form surface, an spherical surface, a flat surface, and a concave surface.

The optical image from the PGU may be incident on the transmissible compensatory HOE along a first optical image path and the optical image reflected by the second mirror may be incident on the HOE along a second optical path. The first optical image path and the second optical path may be configured to have temperatures within a common temperature range.

The temperature range may be equal to or less than 10° C.

The HOE may be configured to be built into a color holographic HUD. The transmissible compensatory HOE may be substantially equal in structure to the HOE.

The HOE may include a first curved surface, the first mirror may include a second curved surface having a curvature determined based on an optical system structure of the holographic HUD, and the transmissible compensatory HOE may include an interference pattern determined based on an optical system structure of the first mirror and the holographic HUD.

In response to the change of the wavelength, the HOE may be configured to diffract the optical image reflected by the second mirror at a fourth diffraction angle different from the first diffraction angle to provide the output optical image in the target direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
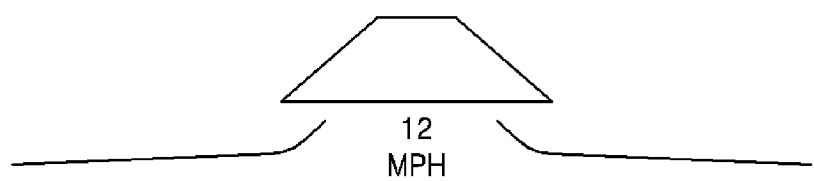
FIG. 1 illustrates a typical color separation in a holographic HUD due to wavelength changes of light sources when two different color lasers are used and subjected to a temperature change.
Figure 1:
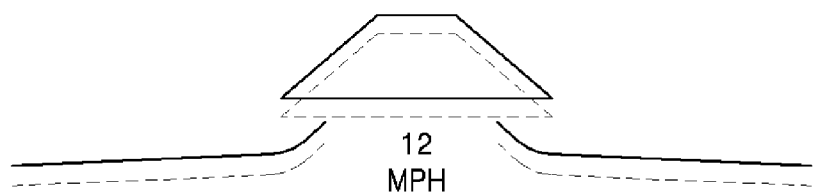

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

The present disclosure in some embodiments seeks to provide a holographic HUD, including a holographic optical element (HOE), which is configured to prevent a color separation of an image observed at the driver's position even when the wavelength of the laser light source varies due to temperature changes.

Figure 3:
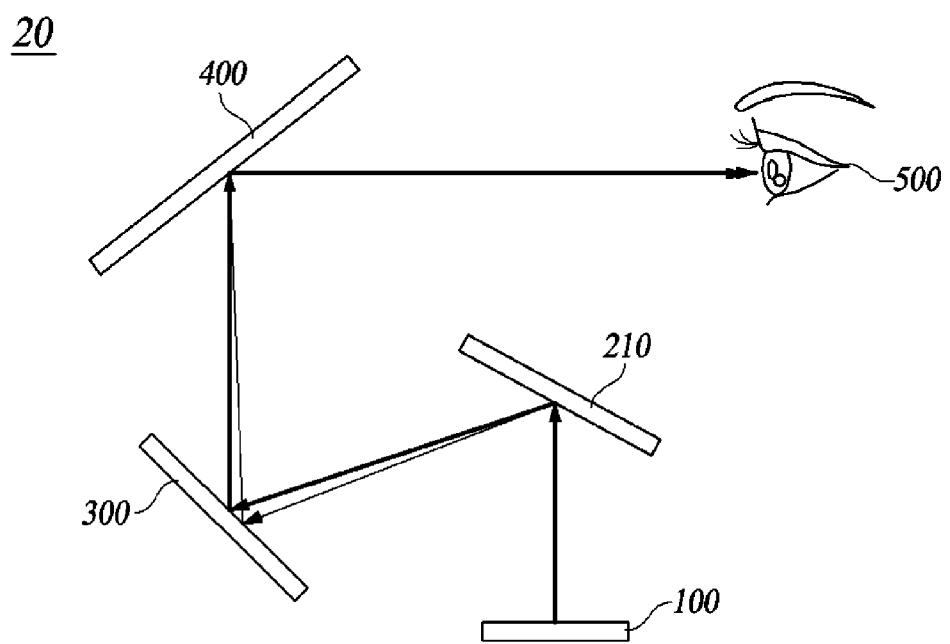
FIG. 3 shows the concept of a self-compensating holographic HUD using a reflective HOE according to at least one embodiment of the present disclosure.

FIG. 3 shows the concept of a self-compensating holographic HUD using a reflective HOE according to at least one embodiment of the present disclosure.

Figure 2:
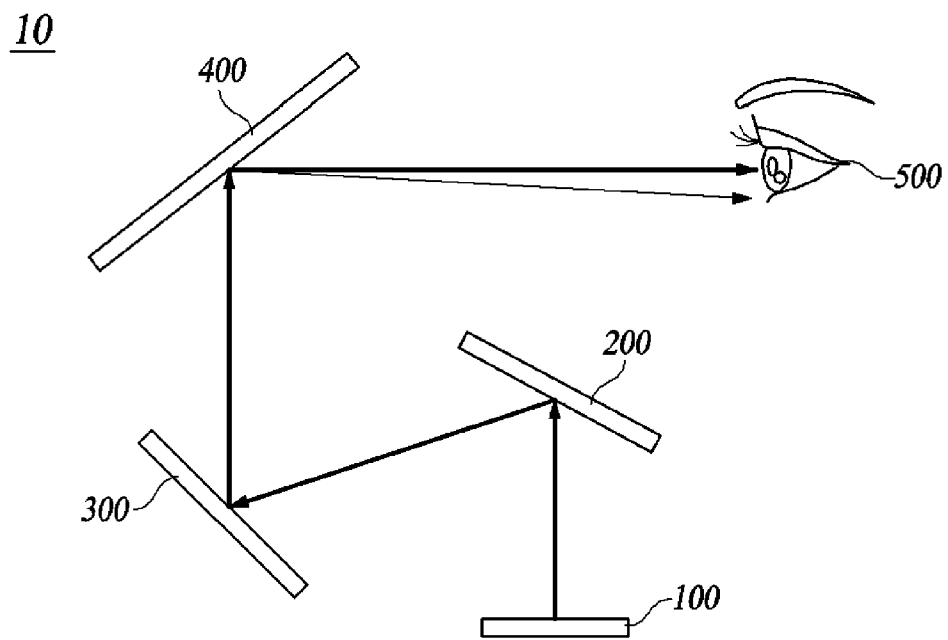
FIG. 2 shows the concept of a typical holographic HUD.

As shown in FIG. 3, a self-compensating holographic HUD 20 according to at least one embodiment includes a reflective compensatory HOE 210 instead of the first mirror 200 compared with a holographic HUD 10 shown in FIG. 2.

The self-compensating holographic HUD 20 includes first and second mirrors 200 and 300, which may be of different shapes according to the optical system design, such as one or a combination of a free-form surface, an spherical surface, a flat surface, and a concave surface.

Taking into account of the variation of a diffraction angle due to a change in the wavelength of a laser, the reflective compensatory HOE 210, according to at least one embodiment, is so formed as to render the holographic HUD 20 to have its optical path capable of self-compensation in its entirety. When the laser wavelength varies due to a temperature change, the diffracted light from the reflective compensatory HOE 210 is emitted at an angle different from that before the temperature change. In the illustrated example, light emitted from the reflective compensatory HOE 210 turns and shifts after a temperature change to the left of the light traveling direction. The light emitted from the reflective compensatory HOE 210 is reflected from the second mirror 300 and incident on the HOE 400 with a changed incident angle, so that the HOE 440 may provide the light in a target direction, e.g., in a direction toward the driver, regardless of the temperature change. The diffraction angle characteristic for the wavelength of the reflective compensatory HOE 210 may be designed, taking account of the optical system structure of the self-compensating holographic HUD 20.

Figure 4:
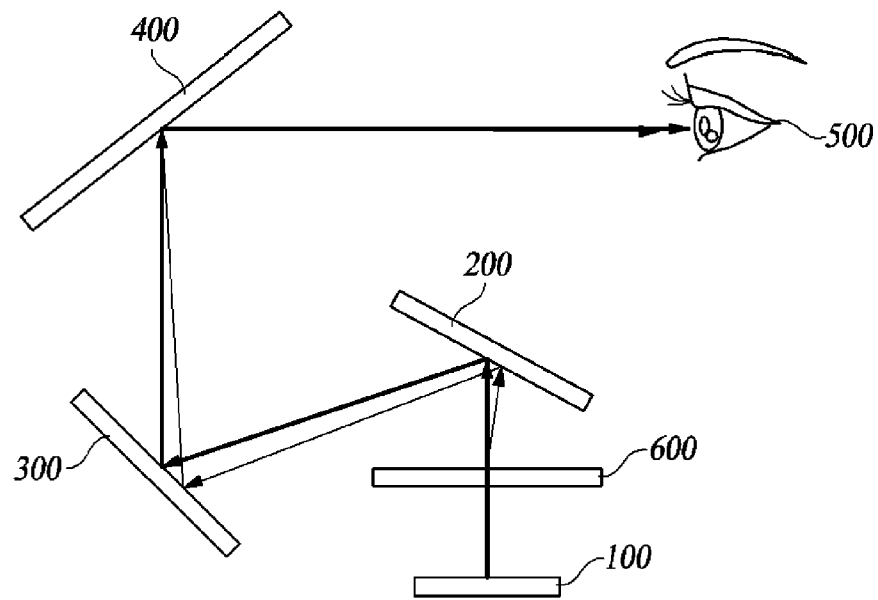
FIG. 4 shows the concept of a self-compensating holographic HUD further including a transmissible HOE according to another embodiment of the present disclosure.

FIG. 4 shows the concept of a self-compensating holographic HUD further including a transmissible HOE (holographic optical element) according to another embodiment of the present disclosure.

As shown in FIG. 4, a self-compensating holographic HUD 30 according to another embodiment of the present disclosure further includes a transmissible compensatory HOE 600 between a first mirror 200 and a picture generation unit (PGU) 100.

Taking account of the variation of a diffraction angle due to a change in the wavelength of a laser, the transmissible compensatory HOE 600, according to another embodiment is so formed as to render the holographic HUD 30 to have its optical path capable of self-compensation in its entirety. When the laser wavelength varies due to a temperature change, the diffracted light from the transmissible compensatory HOE 600 is emitted at an angle different from that before the temperature change. In the illustrated example, the light that is refracted by passing through the transmissible compensatory HOE 600 turns and shifts after a temperature change to the right of the light traveling direction. The light emitted from the transmissible compensatory HOE 600 is reflected from the first mirror 200, and then reflected from the second mirror 300 and incident on the HOE 400 with a changed incident angle, so that the light finally emitted toward the driver can follow the constant path regardless of the temperature change. The diffraction angle characteristic for the wavelength of the transmissible compensatory HOE 600 may be designed, taking account of the optical system structure of the self-compensating holographic HUD 30.

Figure 5:
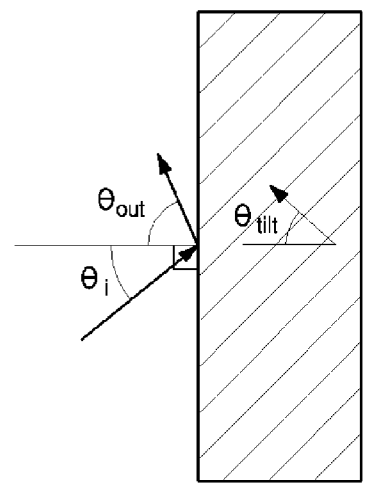
FIG. 5 shows the characteristics of the reflective HOE and the transmissible HOE according to some embodiments of the present disclosure.
Figure 5:
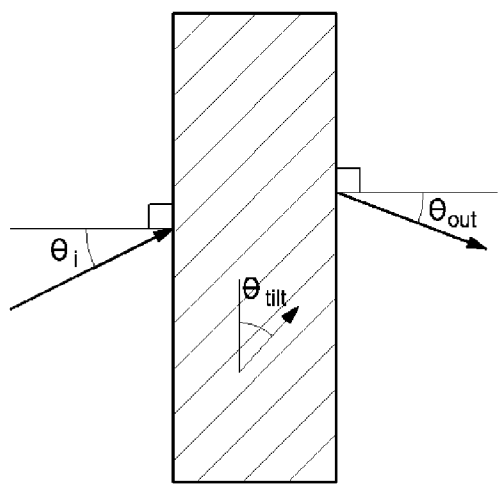

FIG. 5 shows the characteristics of the reflective compensatory HOE and the transmissible compensatory HOE according to some embodiments of the present disclosure.

HOE is preformed with an interference pattern to selectively react to the incident light having a specific incident angle and a specific wavelength so that the desired diffraction is obtained. The interference pattern is formed to satisfy the Bragg matching condition of the HOE so that light is diffracted with high diffraction efficiency at a specific wavelength.

As shown in FIG. 5 at (a), with the reflective compensatory HOE 210, diffraction of light has the relationship as in Equation 1.

$$\lambda=2\Lambda \cos(\theta_i \alpha \theta_{tilt})  \quad \text{Equation 1}$$

Here, $\lambda$ is the wavelength of the incident light, $\Lambda$ is the period of the volume grating of the interference pattern formed in the HOE, $\theta_i$ is the incident angle of the light, $\theta_{tilt}$ is the diffraction angle, and $\theta_{out}$ is the output angle of light.

Volume grating period $\Lambda$ is a fixed value reelected during the production of the HOE. Referring to Equation 1, it can be seen that incident angle $\theta_i$ is constant. Thus diffraction angle $\theta_{tilt}$ due to the interference pattern of the HOE changes according to the relationship of Equation 1 when wavelength $\lambda$ of the incident light changes with temperature.

As shown in FIG. 5 at (b), the transmissible compensatory HOE 600 generates diffraction of light having a relationship as in Equation 2. When wavelength $\lambda$ of the incident light changes with temperature, diffraction angle $\theta_{tilt}$ will change according to the relationship of Equation 2.

$$\lambda=2\Lambda \sin(\theta_i+\theta_{tilt}) \quad \text{Equation 2}$$

The reflective compensatory HOE 210 or the transmissive compensatory HOE 600 according to some embodiments may be designed and manufactured by taking account of the optical system structure of the holographic HUD that incorporates the reflective compensatory HOE 210 or the transmissive compensatory HOE 600 and by using the relationship of Equation 1 or Equation 2.

Meanwhile, the present disclosure may be implemented into a color holographic HUD that utilizes an R/G/B (Red, Green, Blue) light source and a HOE in which HOE films corresponding to the respective colors are stacked. Alternatively, the present disclosure may utilize a HOE formed with stacks of a single HOE film with two interference patterns being superimposed for two colors and a HOE film for a single color. For example, the HOE for a color holographic HUD may be configured by combinations of RG/B, R/GB, or RB/G. Alternatively, three interference patterns may be superimposed on one HOE film for three colors.

When applied to a color holographic HUD, the reflective compensatory HOE 210 and the transmissive compensatory HOE 600 according to the embodiments may be formed in a structure corresponding to the configuration of the HOE film.

Additionally, the HOE 400 may be configured to have a curved surface, wherein the reflective compensatory HOE 210 is preferably formed of a curved surface having a curvature determined based on an optical system structure of the holographic HUD 20. With the transmissive compensatory HOE 600, the first mirror 200 is formed into a curved surface having a curvature determined based on an optical system structure of the holographic HUD 30. The transmissive compensatory HOE 600 may be configured to have an interference pattern determined based on a structure of the first mirror 200 and an optical system structure of the holographic HUD 30.

On the other hand, the self-compensating holographic HUD, according to at least one embodiment, utilizes two HOEs (i.e., HOE in the windshield and compensatory HOE) arranged in pairs to correspond to each other. The pair of HOEs, such as the pair of the reflective compensatory 210 and the HOE 400 of FIG. 3 or the pair of the transmissive compensatory 600 and the HOE 400 of FIG. 4 are configured so that the respective varied diffraction angles compensate with each other to provide the constant output direction of an optical image even with the varied wavelength of the laser incident on the HOEs due to temperature change. It is desirable for the HOE disposed of in a windshield and the compensatory HOE to have the same temperature condition. In actual situations, the temperature close to the windshield and the temperature of the HUD optical system may be different. However, the effect of temperature difference may be neglectable as the light path is short.

It is preferable to keep the temperature uniform throughout the optical path between the HOE 400 and the compensatory HOEs 210 or 600 to ensure the quality of the self-compensating holographic HUD according to at least one embodiment. To this end, the self-compensating holographic HUDs 20 and 30 according to embodiments may be formed such that a region between the HOE 400 and the compensatory HOEs 210 or 600 has a communicating structure for allowing air convection. Alternatively, the self-compensating holographic HUDs 20 and 30 may be formed to control the internal temperature of the HUD optical system so that the temperature of the region where the compensatory elements 210 or 600 are disposed is maintained within a predetermined range in response to the regional temperature of the light path toward the HOE 400. The temperature of the optical path between the HOE 400 and the compensatory HOEs 210 or 600 may be practically controlled to maintain a deviation within 10° C., preferably within 5° C., thereby improving the quality of self-compensation by the compensatory HOEs 210 or 600 according to embodiments.

Embodiments of the present disclosure can provide capable holographic HUDs by including an additional HOE formed to self-compensate for the wavelength change of the light source due to the temperature change, to obviate the need for incorporating a separate mechanism and a control unit for temperature measurement or compensating for the wavelength change of the light source, while preventing color separation of images.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A holographic head-up display (HUD), comprising:
a picture generation unit (PGU) including at least one laser light source to generate an optical image to be projected on a HUD;
a first mirror to reflect the optical image directly from the PGU;
a second mirror to reflect the optical image reflected by the first mirror; and
a holographic optical element (HOE) to diffract the optical image reflected by the second mirror at a first diffraction angle to provide an output optical image in a target direction,
wherein:
the first mirror comprises a reflective compensatory HOE to diffract the optical image from the PGU at a second diffraction angle; and
in response to change of a wavelength of the optical image from the PGU, the reflective compensatory HOE is configured to diffract the optical image from the PGU at a third diffraction angle different from the second diffraction angle such that the HOE provides the output optical image in the target direction based on the following equation:

$$\lambda = 2\Lambda \cos(\theta_i + \theta_{tilt}),$$

where $\lambda$ is a wavelength of light incident to the reflective compensatory HOE, $\Lambda$ is a period of a volume grating of an interference pattern formed in the reflective compensatory HOE, $\theta_i$ is an incident angle of the light incident to the reflective compensatory HOE, and $\theta_{tilt}$ is a diffraction angle of the reflective compensatory HOE.

2. The holographic HUD of claim 1, wherein the second mirror comprises any one or a combination of a free-form surface, an aspherical surface, a flat surface, and a concave surface.

3. The holographic HUD of claim 1, wherein the optical image from the PGU is incident on the reflective compensatory HOE along a first optical image path and the optical image reflected by the second mirror is incident on the HOE along a second optical path, wherein the first optical image path and the second optical path are configured to have temperatures within a common temperature range.

4. The holographic HUD of claim 3, wherein the temperature range is equal to or less than 10° C.

5. The holographic HUD of claim 1, wherein:
the HOE is configured to be built into a color holographic HUD; and
the reflective compensatory HOE and the HOE are substantially formed into the same shape.

6. The holographic HUD of claim 1, wherein the HOE includes a first curved surface, and the reflective compensatory HOE includes a second curved surface having a curvature determined based on an optical system structure of the holographic HUD.

7. The holographic HUD of claim 1, wherein, in response to the change of the wavelength, the HOE is configured to diffract the optical image reflected by the second mirror at a fourth diffraction angle different from the first diffraction angle to provide the output optical image in the target direction.

8. A holographic head-up display (HUD), comprising:
a picture generation unit (PGU) including at least one laser light source to generate an optical image to be projected on a HUD;
a first mirror to reflect the optical image from the PGU;
a second mirror to reflect the optical image reflected by the first mirror;
a holographic optical element (HOE) to diffract the optical image reflected by the second mirror at a first diffraction angle to provide an output optical image in a target direction; and
a transmissive compensatory HOE disposed between the PGU and the first mirror to diffract the optical image from the PGU at a second diffraction angle,
wherein, in response to change of a wavelength of the optical image from the PGU, the transmissive compensatory HOE is configured to diffract the optical image from the PGU at a third diffraction angle different from the second diffraction angle such that the HOE provides the output optical image in the target direction based on the following equation:

$$\lambda = 2\Lambda \sin(\theta_i + \theta_{tilt}),$$

where $\lambda$ is a wavelength of light incident to the transmissive compensatory HOE, $\Lambda$ is a period of a volume grating of an interference pattern formed in the transmissive compensatory HOE, $\theta_i$ is an incident angle of the light incident to the transmissive compensatory HOE, and $\theta_{tilt}$ is a diffraction angle of the transmissive compensatory HOE.

9. The holographic HUD of claim 8, wherein the second mirror comprises any one or a combination of a free-form surface, an aspherical surface, a flat surface, and a concave surface.

10. The holographic HUD of claim 8, wherein the optical image from the PGU is incident on the transmissive compensatory HOE along a first optical image path and the optical image reflected by the second mirror is incident on the HOE along a second optical path, wherein the first optical image path and the second optical path are configured to have temperatures within a common temperature range.

11. The holographic HUD of claim 10, wherein the temperature range is equal to or less than 10° C.

12. The holographic HUD of claim 8, wherein:
the HOE is configured to be built into a color holographic HUD; and
the transmissive compensatory HOE is substantially equal in structure to the HOE.

13. The holographic HUD of claim 8, wherein the HOE includes a first curved surface, the first mirror includes a second curved surface having a curvature determined based on an optical system structure of the holographic HUD, and the transmissive compensatory HOE comprises an interference pattern determined based on an optical system structure of the first mirror and the holographic HUD.

14. The holographic HUD of claim 8, wherein, in response to the change of the wavelength, the HOE is configured to diffract the optical image reflected by the second mirror at a fourth diffraction angle different from the first diffraction angle to provide the output optical image in the target direction.

\* \* \* \* \*